United States Patent [19]
Cai et al.

[11] Patent Number: 6,078,645
[45] Date of Patent: *Jun. 20, 2000

[54] APPARATUS AND METHOD FOR MONITORING FULL DUPLEX DATA COMMUNICATIONS

[75] Inventors: Lujing Cai; Herbert B. Cohen, both of Monmouth; Richard Rogoszewicz, Camden; Mingjie Wang, Monmouth, all of N.J.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/803,475

[22] Filed: Feb. 20, 1997

[51] Int. Cl.[7] .............................. H04M 1/24; H04M 3/00
[52] U.S. Cl. ................................. 379/3; 379/406; 379/410
[58] Field of Search .......................... 379/1, 93.31, 93.32, 379/406, 411, 345, 410; 370/290, 286; 375/222

[56] References Cited

U.S. PATENT DOCUMENTS

| | | | |
|---|---|---|---|
| 4,162,378 | 7/1979 | Baudoux et al. ..................... | 179/170.2 |
| 4,694,450 | 9/1987 | Staab ...................................... | 370/32.1 |
| 4,799,214 | 1/1989 | Kaku ...................................... | 370/32.1 |
| 4,825,459 | 4/1989 | Farrow et al. ............................. | 379/3 |
| 4,987,569 | 1/1991 | Ling et al. ............................. | 370/32.1 |
| 5,280,473 | 1/1994 | Rushing et al. ....................... | 370/32.1 |
| 5,323,459 | 6/1994 | Hirano .................................... | 379/391 |
| 5,351,287 | 9/1994 | Bhattacharyya et al. ................. | 379/95 |
| 5,353,280 | 10/1994 | Ungerbock ............................ | 370/32.1 |
| 5,490,199 | 2/1996 | Fuller et al. ............................. | 379/1 |
| 5,751,796 | 5/1998 | Scott et al. .......................... | 379/93.31 |
| 5,764,694 | 6/1998 | Rahamim et al. ....................... | 375/224 |
| 5,799,010 | 8/1998 | Lomp et al. ............................ | 370/335 |
| 5,892,757 | 4/1999 | Norrell et al. .......................... | 370/292 |

*Primary Examiner*—David L. Ometz
*Assistant Examiner*—Kenneth W. Fields

[57] ABSTRACT

A modem monitor for monitoring full duplex communications comprises one receiver for each data stream and an echo canceler for canceling "far" echo. Prior to each receiver decoding the data stream it is designed to monitor, it replicates an echo expected to be found in its received data stream from a sample of each of the other predecoded data streams. The echo canceler then subtracts the expected echo from the received data stream to remove all far echoes caused by the other data streams. The echo canceled data stream is then decoded. The monitor can also include a data communications network interface and a sample rate converter operating with the PSTN for converting from the network transmission rate to the data transmission rate.

11 Claims, 6 Drawing Sheets

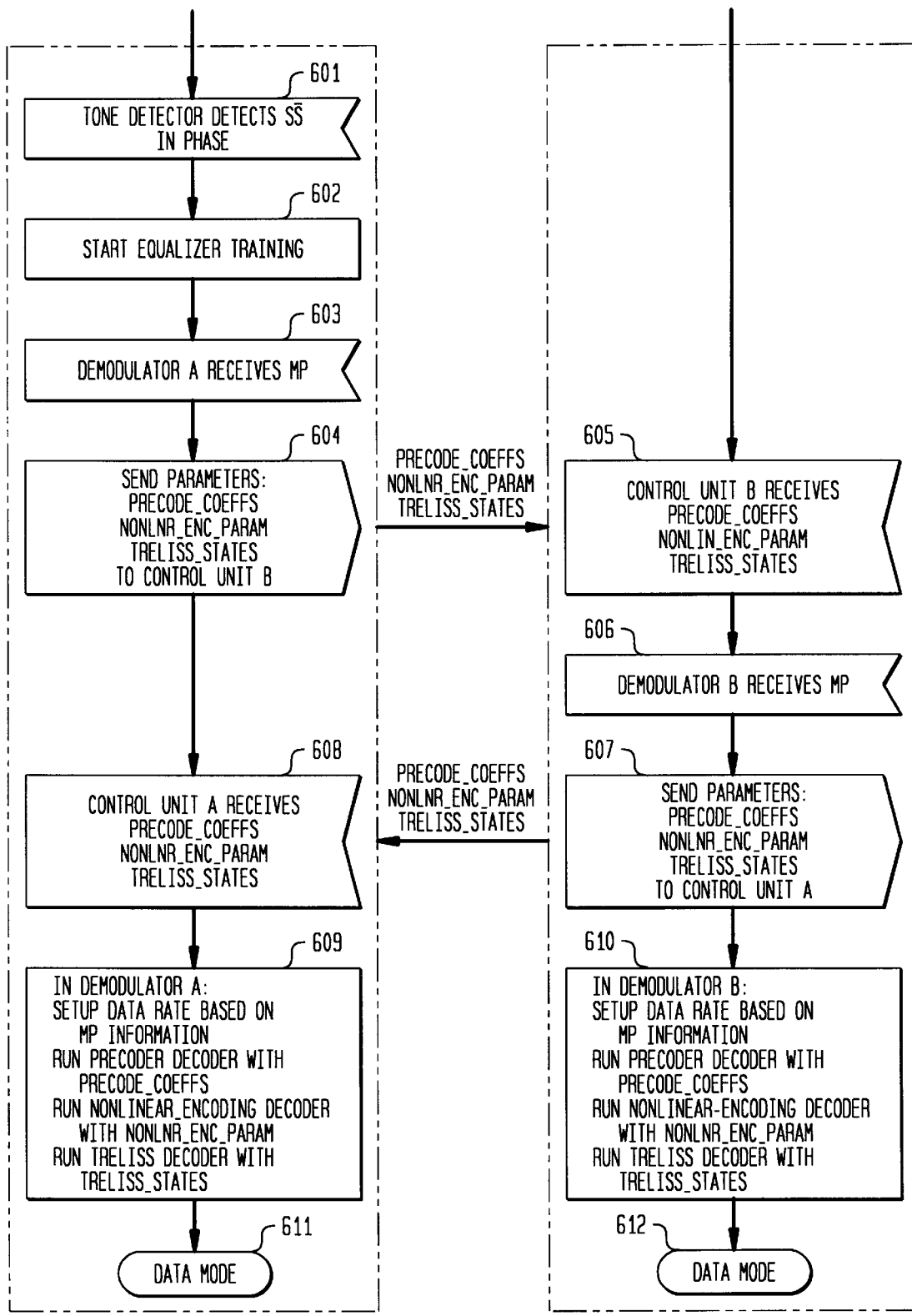

6,078,645

APPARATUS AND METHOD FOR MONITORING FULL DUPLEX DATA COMMUNICATIONS

FIELD OF THE INVENTION

This invention relates generally to a monitor apparatus operable in a full duplex communication scheme. In particular, the monitor of the present invention is designed for monitoring data communications between two modems operating within the Public Switched Telephone Network (PSTN), according to the V.32, V.32 bis or V.34 protocols.

BACKGROUND OF THE INVENTION

It is often desirable to monitor data communications for various diagnostic information, including monitor quality of transmission, line impairments, bit error rates, modulation parameters, or the raw transferred information rate. Indeed, data modems frequently incorporate some form of modem diagnostics. In its simplest form a modem monitor is a receiver that bridges the line of a transmission and listens to the transmission.

Until recently, most data communications were half duplex or split-band. In other words, either one modem alone would transmit at any one time or two modems would occupy different frequency bands of the channel. Thus a modem monitor could alternately listen in to the transmissions of the modems engaged in data communications and monitor both directions. More recently, however, high speed full duplex, echo canceling communication techniques have become common in which a plurality of modems transmit simultaneously on the same frequency bands. Monitoring full duplex communications is more difficult than monitoring half duplex communications as the monitoring receiver must listen to and distinguish between two simultaneous transmissions in opposite directions. Prior to the present invention, no effective method or apparatus for monitoring full duplex, echo canceling was known.

SUMMARY OF THE INVENTION

The present invention provides a modem monitor for monitoring full duplex communications. The modem monitor can demodulate the signals exchanged in a full duplex communication between two or more transmitters, such as data modems, synchronous with the data streams received at either modem, and retrieve information such as data rates and performance, useful for modem diagnostics. More specifically for V.34, the modem monitor can extract the bit rates, symbol rates, carrier frequency, round-trip delay, and other modulation parameters and retrieve the bit streams that are transferred between two communicating modems.

The modem monitor comprises two sets of components, each set comprising a receiver, a waveform echo canceler and can include a sample rate converter. The waveform signal from each modem is detected by a different one of the two sets of components, at a point in the Public Switched Telephone Network ("PSTN") where transmission is 'four wire,' that is transmission in each direction takes place over a separate path. Examples of such four wire transmission facilities are T1 carrier and analog carrier systems. The detected waveform of each set of components is also the input to the echo canceler of the other set of components, from which an echo of that waveform is generated. The generated echo is subtracted from the detected waveform signal in the respective receivers, leaving an echo free signal. The echo free signal may be input to a sample rate converter to change the sample rate of the signal from that of the network from which the signals were detected, to the true sample rates of the data streams. The converted signals are demodulated and then decoded in their respective receivers. For a V.32 or V.34 startup, the two receivers must operate in parallel, exchanging messages to successfully sequence training of the two modem monitor receivers.

Instructions for operating the modem monitor of the present invention can be controlled by an operator through a general purpose processor, such as a personal computer. Alternatively, the instructions can be hardwired in the modem monitor or stored in memory.

BRIEF DESCRIPTION OF THE DRAWINGS

FIG. 6 is a flow chart illustrating the steps taken by the respective receivers of the modem monitor during the fourth phase of a call startup.

DETAILED DESCRIPTION OF THE INVENTION

Figure 1:
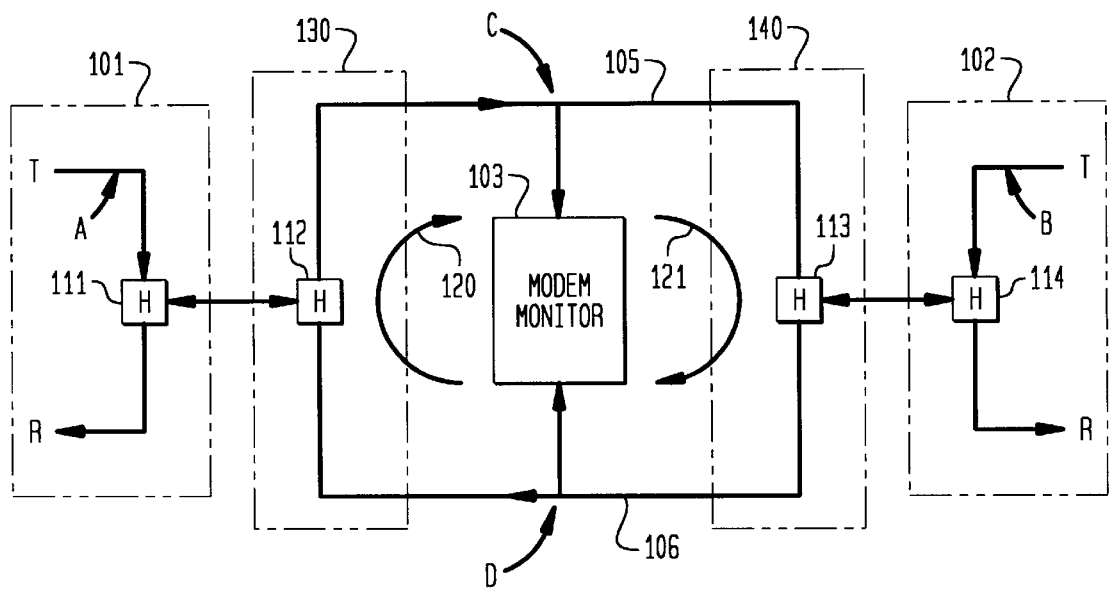
FIG. 1 is a schematic of the modem monitor of the present invention within a telephone network, for receiving the full duplex data streams of communication between two modems.

Referring to FIG. 1 a modem monitor 103 according to the present invention sits within a PSTN and bridges onto the two unidirectional channel paths 105 and 106 to simultaneously monitor the data stream transmitted by modem 101 and the data stream transmitted by Modem 102. Modem monitor 103 must receive both data streams simultaneously since modems 101 and 102 communicate in full duplex mode.

Figure 2:
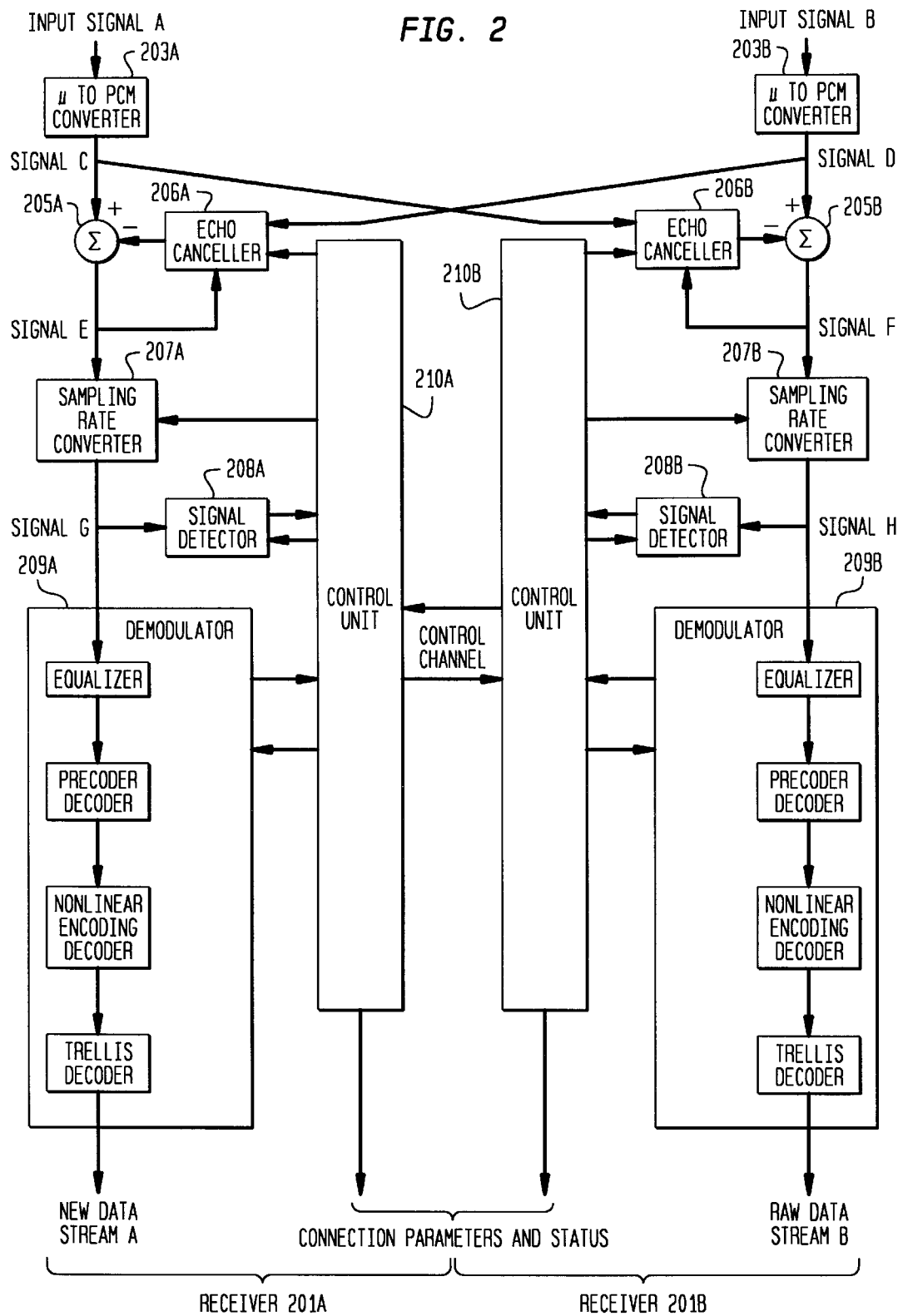
FIG. 2 illustrates the architecture of the modem monitor of the present invention.

Referring to FIG. 2 the architecture of one embodiment of modem monitor 103 of the present invention, when the communication channel is T1, is shown to comprise two symmetric receivers 201A and 201B, each comprising a mu-law to linear digital convertor 203A and 203B, an echo canceller 206A and 206B, a sampling rate converter 207A and 207B, a signal detector 208A and 208B, a demodulator 209A and 209B, and a control unit 210A and 201B, respectively.

In general, each of the receivers 201A and 201B bridge onto their respective data streams on the PSTN through an interface. For the embodiment shown in FIG. 2 that interface is mu-law to linear digital converter 203A and 203B each of which operates on digitized voice channels running at 64 Kb/s and 8 k samples/sec according to mu-law, within a T/1 carrier system. Modem monitor 103 uses two signals as its input. Signal A is the signal transmitted from modem 101 to modem 102, and signal B is from modem 102 to modem 101. Receiver 201A analyzes signal A while receiver 201B analyzes signal B. When converted from the mu-law format to the PCM format the signals are denoted as signals C and D.

To simplify the remaining discussion, we will hereafter focus on receiver 201A alone, wherever possible. It should be understood that receiver 201B operates in like fashion. In receiver 201A, signal C is first presented as input to echo canceller 206A to cancel a "far" echo. Far echo arises in full duplex systems due to the hybrid circuitry 112 and 113 used to interface the four network wires into the two local wires to each transmitter/receiver. Thus with modem monitor 103, the echo canceller is used to cancel only an undesired echo of a signal originating from a transmitter where the echo is reflected back due to the hybrid at the remote central office. Thus the echo canceller does not know the true symbol stream of the signal it seeks to receive and thus has no reference signal with which to cancel the "far" echo.

For example, a data stream transmitted from modem 101 along channel 105 through hybrid circuit, 111 and hybrid circuit 112 in remote central office 130, is received by modem 102, through hybrid circuit 113 in remote central office 140, and hybrid circuit 114. That transmission also produces a reflection 121 along channel 106 which carries the data stream from modem 102 to modem 101. Similarly, an echo 120 of a signal from modem 102 makes its way into channel 105, due to hybrid circuits 113 and 114 and remote central office 140. As a result, modem monitor 103 does not receive the pure transmitted data streams of channels 105 and 106, respectively. Rather, each data stream, as for example that carried on channel 106, is a combination of the transmitted data stream from modem 102 and an echo 121 from the transmitted data stream of modem 101.

Referring back to FIG. 2, to cancel the signal D echo, echo canceller 206A uses signal D from receiver 201B as its reference signal and signal C as its desired signal and returns an echo free signal E. As discussed further below, the echo canceller training is performed during the half duplex period of the modem startup connection. For instance, echo canceller 206A is trained when the modem transmitting signal B is sending its signals PP and TRN during phase 3 of the startup and is frozen whenever the modem transmitting signal A is transmitting signals.

The echo free signal E then passes to Sample Rate Converter 207A. As the PSTN sampling rate is a constant 8 kHz, when T1 transmission is used, sample rate conversion is necessary to obtain rates suitable for demodulator 209A, and signal detector 208A. The sampling rate of each converter output is decided by the receiver's symbol rate. Usually, the sampling rate is selected as n times the modem's symbol rate where n is an integer and greater than 1. The output signal of Sampling Rate Converter 207A is denoted as G. Note that for analog carrier systems, interfaces 203A and 203B can be implemented as A/D converters providing samples to modem monitor 103 at the appropriate rates, thus obviating the need for a sample rate converter.

Signal G is then input to Signal Detector 208A, which is used to detect the start up signals as mentioned briefly above, between the two communicating modems. Many start-up signals (i.e. hand-shaking signals) are exchanged between the two modems to set up a data connection. These signals are used for negotiating parameters as well as training the modem receivers. Signal Detectors 208A reports the detected information to control unit 210A which uses the information to decide the modulation parameters and the channel characteristics, and decides based on the information from the signal detector, what signal the signal detector should look for during a subsequent phase in the startup sequence, as further described below.

Control units 210A and 210B are identical. Each of them controls the other components in receivers 201A and 201B, respectively, through a state machine. Since many start-up signals are exchanged over several start-up phases before two communicating modems can setup a data connection, the control units assign different states for each of the particular start-up phases. Based on the inputs from the signal detectors, the control units are able to decide the present state and consequently properly condition the echo canceller, the sampling rate converter, the signal detector and the demodulator to successfully monitor the start-up procedure between the two modems.

Control units 210A and 210B are used to exchange between the two receivers, sample and control information from the two waveform signals. The sample information is exchanged every 8 kHz and is used by the echo cancellers as the reference signal. The control data is generally transmitted by each modem prior to transmitting the primary data. In V.34, for example, the modulation parameters used by the receiver of modem 101 are negotiated and are only communicated by training signals transmitted by modem 101. This information is contained in the V.34 INFO1a and INFO1c sequences during startup. Consequently, the receiver of modem monitor 103 receiving a signal on channel 105 must also decode the proper INFO sequence on channel 106 in order to properly monitor the primary signal transmitted on channel 105. Thus, receiver 201A will detect the INFO1 sequence of signal A and receive the INFO1 sequence of signal B from control unit 210B, and receiver 201B will detect the INFO1 sequence of signal B and receive the INFO1 sequence of signal A from control unit 210A. After the start-up and rate negotiation, the communicating modems will agree on the modulation parameters that are to be used by each of them for data mode transmission. Once demodulators 209A and 209B know the modulation parameters through control units 210A and 210B, respectively, the demodulators are able to demodulate signals G and H.

Modem monitor 103 is able to analyze the startup signals exchanged between modems 101 and 102 through which the device is able to retrieve information about the modems and their connection. The method for retrieving the information is described below. For convenience, it is assumed that modem 101 is the originating or calling modem, modem 102 is the answering modem, receiver 201A directly detects the transmission from modem 102, and receiver 201B directly detects the transmission from modem 101.

Figure 3:
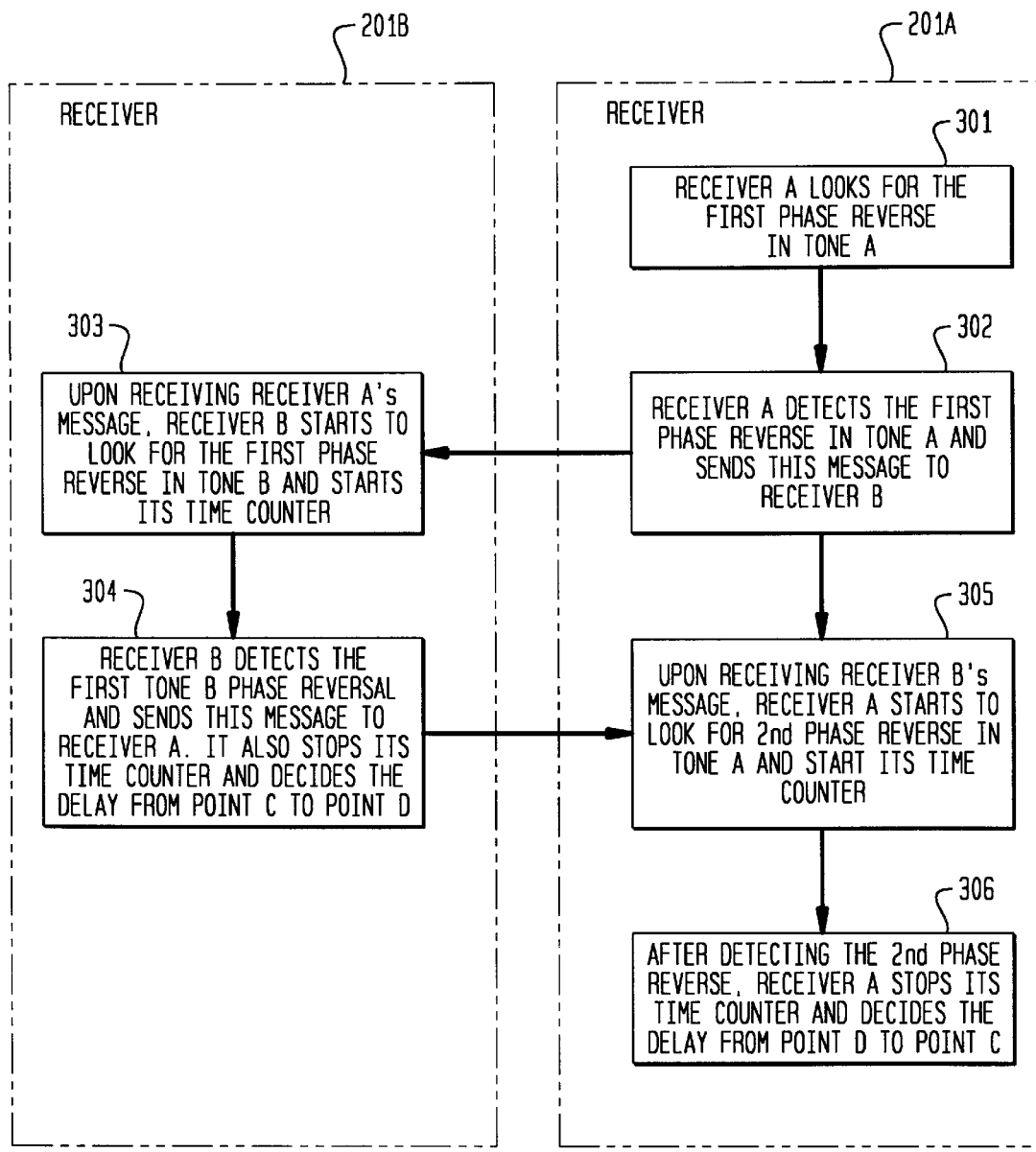
FIG. 3. is a flow chart illustrating the steps taken by the respective receivers of the modem monitor for measuring the network delivery.

Referring to FIG. 3, a flow chart shows one useful application of the modem monitor 103 of the present invention, namely the steps in measuring the network round trip delay ("RTD"). There are two delays associated with a connection: the delay from point D to point C and the delay from point C to point D, as shown in FIG. 1. The two modems measure the RTD's by exchanging the tone A and B signals transmitted during the phase 1 startup, as specified in the V.34 protocol. First, control unit 210A conditions its receiver to look for a 180 degrees phase change in tone A that is sent by modem 102 as shown by block 301. When receiver 201A detects the first 180 degree phase change in tone A, it sends this information to receiver 201B as shown in block 302. Upon receiving this information from receiver 201A, receiver 201B knows that the next signal sent by modem 101 will have a 180 degree phase change in tone B, as specified in the V.34 protocol, and conditions itself to detect this phase change as shown by block 303. Some period of time later, receiver 201B detects the 180 degree phase reverse in the waveform sent by modem 101. This time period then allows receiver 201B to decide the echo delay from point C to point D as shown by block 304.

Receiver 201B then conveys to receiver 201A that it received the first tone B phase reversal. When receiver 201A receives this message it begins a time counter until it detects a second phase reversal in Tone A as shown by block 305. Upon detecting the second phase reversal in tone A, receiver 201A stops it counter and can determine the delay from point D to point C as shown by block 306.

Figure 4:
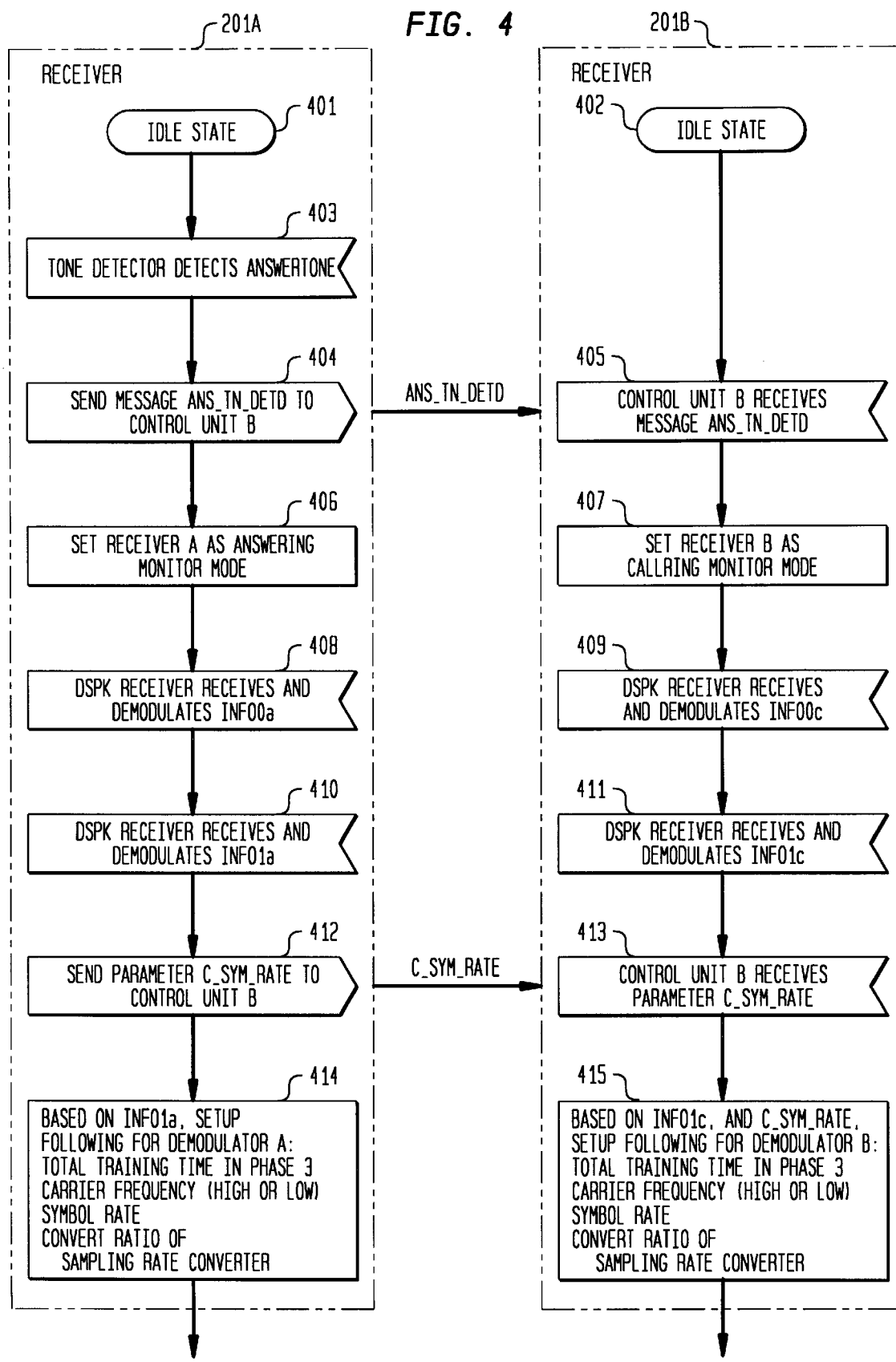
FIG. 4 is a flow chart illustrating the steps taken by the respective receivers of the modem monitor during the second phase of a call startup.

Referring to FIG. 4, the exchange of status and control information between control units 210A and 210B is shown for the phase 2 startup during call initiation between two modems. According to either V.34 and V.32 protocols, an answering modem sends an answer tone upon receiving a signal from a calling modem. As modem monitor 103 must first determine which of the modems is the calling modem, the control units condition their respective signal detectors to detect the answer tone levels from signals C and D, respectively while their receivers are still in an idle state as shown by blocks 401 and 402, prior to monitoring any calls. Since both signal detectors will detect answer tones, one the direct signal, the other the echo, the detected answer tones are compared, and the one with the greater amplitude is selected as the direct signal. Thus, as shown by block 403, receiver 201A for example, detects the true answer tone. A message is sent from control unit 210A to control unit 210B as shown by blocks 404 and 405, that receiver 201A received the direct answer tone. Subsequently, receiver 201A is set to receive the answering modem's transmissions and receiver 201B is set to receive the calling modem's transmission as shown by blocks 406 and 407.

At this point, modem monitor 103 can begin to determine the two V.34 modems' respective capabilities. To do so, control unit 210 B conditions its receiver to demodulate signal INFO0c sent by the calling modem as shown by block 409, and can decode the bit stream to learn the capabilities of the calling modem. Similarly, the answering modem's capabilities can be determined by receiver 201A by demodulating the INFO0a data stream as shown by block 408.

For the demodulators to successfully receive the respective modem signals it is necessary to determine the symbol rates to be used by both receivers. To determine the symbol rates, receiver 201A is conditioned to demodulate signal INFO1a as shown by block 401 and decodes the bit stream to decide the symbol rates to be used by both modems. Receiver 201A then sends the symbol rate to control unit 210B as shown by block 413. In blocks 414 and 415, demodulators 209A and 209B are initiated based on the INFO1a, INFO1c and C SYM RATE for the echo canceller training time in phase 3, the carrier frequency symbol rate, and sample rate converter ratio.

Figure 5:
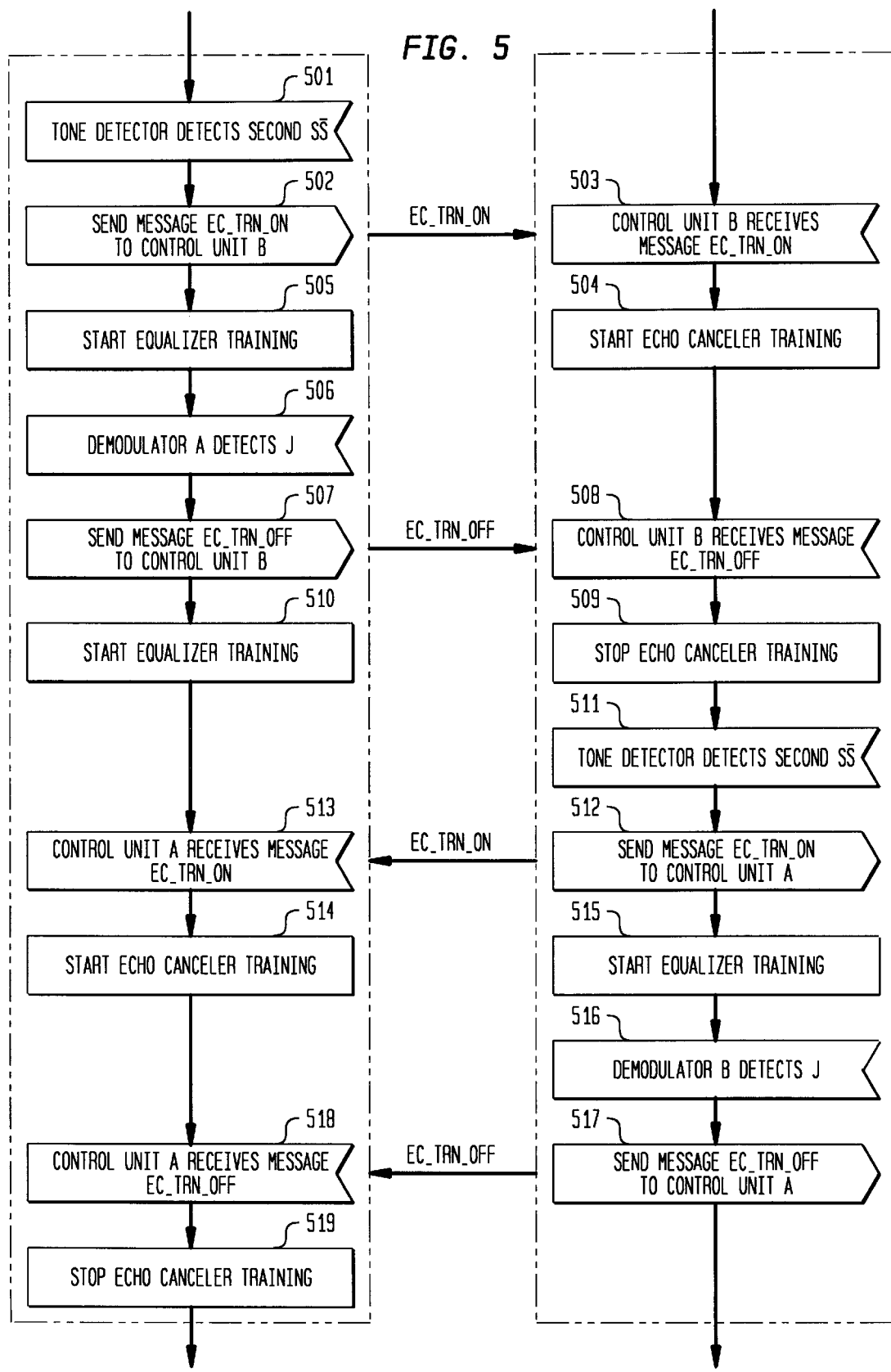
FIG. 5 is a flow chart illustrating the steps taken by the respective receivers of the modem monitor during the third phase of a call startup.

Referring to FIG. 5, during the third phase of the V.34 startup the respective receivers train their respective echo cancellers and equalizers. The calling modem and answering modem each have periods during which they do not transmit any signals. It is during this period that the respective receivers of modem monitor 103 can train their echo cancellers since any detected signal is known to be an echo from the other modem. Thus when receives 201A receives the second $\overline{ss}$ tone that signals the beginning of a signal in accordance with the V.34 protocol and shown in block 501, it knows that the answering modem is about to transmit and the calling modem will be silent. Control unit 210A signals control unit 210B to begin its echo canceler training as shown by blocks 502 through 504 as the calling modem will be silent for a predetermined period of time. During this time, receiver 201A trains its equalizer, block 505, receives and demodulates signal J, block 506 and then sends a message to control unit 210A to end echo canceller training for echo canceller 206B, blocks 507 through 509.

While control unit 210B ends its echo canceller training, receiver 201A begins equalizer training for a second time as shown by block 510 until it receives a message from control unit 210B to begin training of echo canceller 206A. When receiver 201B detects the second $\overline{ss}$ signal from the calling modem, it sends a message to control unit 210A to begin training echo canceller 201A as shown by blocks 511 through 513. At this point, receiver 201A trains echo canceller 206A, block 514, until it receives a message from control unit 210B to end echo canceller training. During training of echo canceller 206A, receiver 201B trains its equalizer, block 515, demodulates signal J and then instructs control unit 210A to end echo canceller training as shown by blocks 516–519.

As the foregoing describes, the echo canceler training is performed in half-duplex mode. During a V.34 start-up, the echo canceller training can only be performed during TRN and PP sequences, which contains at least 800 symbols. Since it is desirable that the training signal has a wide spectrum, the SS and MD sequences are skipped.

Referring to FIG. 6, to successfully demodulate and decode the data mode modem signals, it is essential for both receivers to determine the modulation parameters to be used by the modems before they enter the data mode. The modulation parameters include bit rates, symbol rates, type of trellis encoder, type of nonlinear encoder, and type of shaping and precoding coefficients. To determine the modulation parameters to be used by the calling modem, control unit 210A first transmits its equalizer training sequence after detecting the second $\overline{ss}$ tone transmitted by the answering modem in accordance with the V.34 protocol and as shown in blocks 601 and 602 and then conditions signal detector 208A to detect signal MP that is sent by the answering modem and retrieve the parameters from the bit stream as shown in block 603. The decoded parameters are then sent to control unit 210B as shown in blocks 604 and 605. Similarly, receiver 201B can be used to detect signal MP sent by the calling modem and retrieve the modulation parameters to be used by the answering modem as shown in block 606. The decoded parameters of the calling modem are then sent to control unit 210A as shown in blocks 607 and 608. These parameters are then used by the respective deomodulators as shown by blocks 609 and 610, to demodulate the data mode communications between the two modems, as shown by blocks 611 and 612.

The modem monitor of the present invention can be built as a plug in board to reside within a personal computer. In this application an operator can control the modem monitoring through the personal computer. One example of the modem monitor of the present invention comprises two general purpose digital signal processor (DSP) plug-in cards, each supporting parallel receivers linked by Serial Input Output (SIO) ports to pass reference signals for the echo cancellers. Each board gets its input from the appropriate modem channel, and passes it to the other board. Thus data signals in both directions of the data traffic are available on each individual board to support the waveform-driven echo canceler. The interface and the SIO are all locked to 8 k sampling frequency for synchronization of the reference and received signals.

Unlike a data-driven echo canceler, the reference signal in the waveform-driven echo canceler has a large dynamic range and needs to be normalized. The normalized leaky least means square ("LMS") algorithm is used in the canceler, where the step size for updating the canceler is calibrated based on the estimated level of the reference signal. Using fixed-point arithmetic, a leaky factor which is very close to but less than 1.0, is applied to the previous results in updating the LMS coefficients. This is the so-called leaky LMS that helps to stabilize the echo canceller.

Note that while the present has been invention described for communication between two modems, the invention can be designed for monitoring full duplex communication between more than two modems, or more than two signals, as for example using multi point leased line configurations. Using the principles taught herein, one skilled in the art will be able to modify the exemplary monitoring apparatus described herein to accommodate more than two signals.

The foregoing merely illustrates the principles of the present invention. Those skilled in the art will be able to devise various modifications, which although not explicitly described or shown herein, embody the principles of the invention and are thus within its spirit and scope.

What is claimed is:

1. An apparatus for monitoring a first data stream transmitted by a first modem to a second modem and a second data stream transmitted by said second modem to said first modem, said first data stream and said second data stream transmitted full duplex on overlapping frequency bands, the apparatus comprising:

a first input means for receiving said first data stream;

a second input means for receiving said second data stream;

a first echo canceler connected to said first input means for canceling an echo resulting from said second data stream present in said received first data stream, thereby providing an echo free first data stream;

a second echo canceler connected to said second input means for canceling an echo resulting from said first data stream present in said received second data stream, thereby providing an echo free second data stream;

a first receiver for decoding said echo free first data stream and providing information decoded from said echo free first data stream;

a second receiver for decoding said echo free second data stream and providing information decoded from said echo free second data stream;

a first signal detector to detect start up sequences in said echo free first data stream and to report information detected from said echo free first data stream;

a second signal detector to detect start up sequences in said echo free second data stream and to report information detected from said echo free second data stream;

a first control unit communicatively connected to said first signal detector to receive said information detected from said echo free first data stream, said first control unit communicatively connected to said first echo canceler to control said first echo canceler and to train said first echo canceler during periods of half duplex operation of said first modem and said second modem with said second modem transmitting and said first modem receiving, said first control unit communicatively connected to said first receiver to control said first receiver and to receive information decoded from said echo free first data stream, said first control unit being able to identify which of said first and second modems is originate modem and which of said first and second modems is answer modem;

a second control unit connected to said second signal detector to receive said information detected from said echo free second data stream, said second control unit communicatively connected to said second echo canceler to control said second echo canceler and to train said second echo canceler during periods of half duplex operation of said first modem and said second modem with said first modem transmitting and said second modem receiving, said second control unit communicatively connected to said second receiver to control said second receiver and to receive information decoded from said echo free second data stream, said second control unit being able to identify which of said first and second modems is originate modem and which of said first and second modems is answer modem, said second control unit communicatively connected to said first control unit to exchange between said first control unit and said second control unit said information detected from said echo free first data stream and said echo free second data stream, and said information decoded from said echo free first data stream and from said echo free second data stream, said second control unit being able to determine transmission parameters of said first and second modems and channel characteristics of channels connecting said first and second modems.

2. An apparatus according to claim 1 further comprising:

a third input means for inputting said received first data stream to said second echo canceler from which a copy of said echo of said first data stream is generated for canceling said echo of said first data stream from said received second data stream; and a fourth input means for inputting said received second data stream to said first echo canceler from which a copy of said echo of said second data stream is generated for canceling said echo of said second data stream from said received first data stream.

3. An apparatus according to claim 1 wherein said first and second data streams are simultaneously transmitted pursuant to a full duplex communication scheme.

4. An apparatus according to claim 1 wherein said first and second data streams are transmitted through a communications network, further comprising an interface for interfacing said apparatus with said data communications network.

5. An apparatus according to claim 4 further comprising a first sample rate converter for converting said echo free first data streams from a first sample rate used on said communications network to a second sample rate at which said first data stream was transmitted, and a second sample rate converter for converting said echo free second data stream from said first sample rate used on said communications network to said second sample rate at which said second data stream was transmitted.

6. An apparatus according to claim 4 wherein said communications network is a Public Switched Telephone Network.

7. An apparatus according to claim 6 wherein said interface is a pulse code modulation interface operating at 8 kHz samples per second according to mu-law.

8. An apparatus according to claim 7 wherein said pulse code modulation interface is an Analog to Digital converter and said communication network is an analog carrier system.

9. An apparatus for monitoring a plurality of data streams transmitted by a plurality of modems, said plurality of modems communicating full duplex on overlapping frequency bands, the apparatus comprising:

a plurality of subsystems, each of said subsystems associated with one of said data streams, each of said data streams associated with one of said subsystems, each of said subsystems, including;

an input means for receiving a data stream associated with said subsystem in which said input means is included;

an echo canceler connected to said input means for receiving said data stream for removing an echo from said data stream caused by one or more of said plurality of data streams, thereby providing an echo canceled data stream;

a receiver for decoding said echo canceled data stream, thereby providing information decoded from said echo canceled data stream;

a signal detector to detect startup sequences in said echo canceled data stream and to provide information detected from said echo canceled data stream; and a control unit communicatively connected to said signal detector, said echo canceler, and said receiver, to receive said information detected from said echo canceled data stream and said information decoded from said echo canceled data stream, to train said echo canceler during periods of half duplex transmissions, to control said receiver, said control unit being communicatively connected with control units of other subsystems of said plurality of subsystems to exchange information therebetween, said control unit being able to distinguish between originate and answer modes of a modem transmitting said data stream associated with said subsystem.

10. An apparatus according to claim 9 wherein said communicating full duplex follows the V.34 protocol.

11. An apparatus according to claim 9 wherein said communicating full duplex follows the V.32 protocol.

* * * * *